May 1, 1928.  
J. KINDERVATER  
1,668,411  
WASHOUT PLUG AND METHOD OF MAKING THE SAME  
Filed Nov. 25, 1925
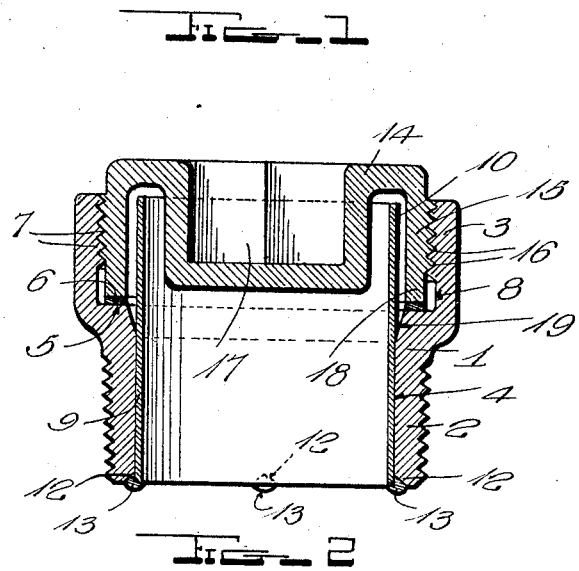
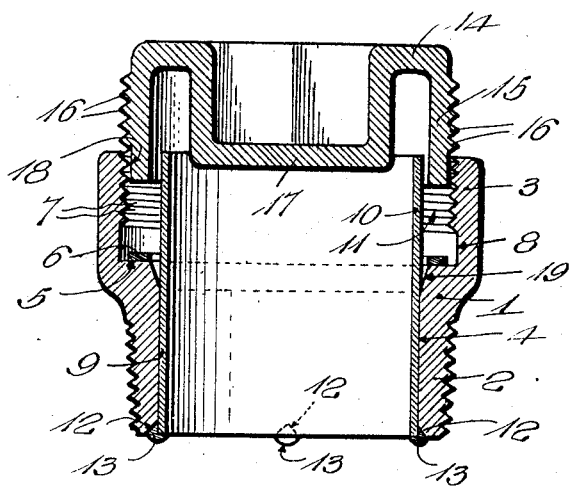
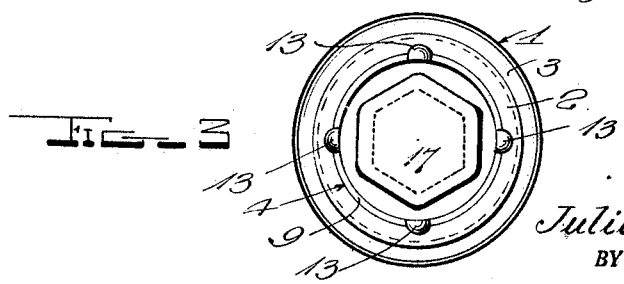
INVENTOR.  
Julius Kindervater,  
BY  
ATTORNEY.

Patented May 1, 1928.

1,668,411

UNITED STATES PATENT OFFICE.

JULIUS KINDERVATER, OF NEW YORK, N. Y.

WASHOUT PLUG AND METHOD OF MAKING THE SAME.

Application filed November 25, 1925. Serial No. 71,400.

This invention relates to washout plugs for use on steam boilers for the purpose of permitting and facilitating washout operations for the removal of mud, scale and other impurities. More especially the invention relates to improvements in washout plugs of that type in which the plug is externally threaded at its inner end to screw into the boiler and is internally threaded at its outer end to receive threads on the flange of a closure cap, a gasket, fitted between opposed surfaces on the plug and cap, being employed to make a leak-proof connection. In the particular type of plug, to which my improvements relate, there is also provided an annular wall lying inside and concentric with an outer wall formed by the internally threaded outer end of the cap, producing between said walls an annular channel or well in which the threaded flange of the cap is received. The function of this inner wall, in a certain prior construction with which I am familiar, in which said inner wall is cast integral with the cap, is to form a seat for the gasket, to serve as a guide for centering and bringing the threaded flange of the cap into position to engage the threaded outer wall referred to, and to serve as a guard to prevent the internal threads of said wall from being damaged by the washout tool. The washout tool employed consists, usually, of a water conducting pipe which is introduced into the boiler through the uncapped plug and manipulated to serve as a poker or scraper to loosen up the mud and scale while a washout stream is flowing through the pipe. In the prior construction referred to, this tool comes in contact with the outer end or gasket seat of this inside wall, causing more or less damage to the gasket seat face, so that an imperfect sealing action and leakage is liable to be caused. Another objection to this prior construction is that the outer wall must be machined prior to threading and these operations are difficult, time-consuming and costly because of the contracted working space between the inner and outer walls. On account of the difficulty of these operations many breakages to tools also occur.

The main object of my invention is to provide a washout plug which is simple of construction, convenient in use, comparatively inexpensive of manufacture, and obviates the objections above-noted.

A further object of my invention is to provide a construction which permits of machining and tapping the plug without liability of its breakage and in a ready, quick and economical manner.

A still further object of my invention is to provide a construction in which the inner wall or shell is formed separately from and adapted to be applied to the plug, after other manufacturing operations are performed.

A still further object of my invention is to provide a construction in which the gasket seat and gasket are so arranged as to be protected from injury, ensuring a leak-proof seal between the plug and cap at all times.

A still further object of the invention is to provide a novel method of making a washout plug of the character described.

The invention consists of the features of construction, combination and arrangement of parts, hereinafter fully described and claimed, reference being had to the accompanying drawing, in which:—

Figure 1 is a central vertical section through a washout plug constructed in accordance with my invention, showing the cap applied.

Figure 2 is a similar view showing the cap removed but as arranged for a preliminary centering action in its application.

Figure 3 is an inner end elevation or bottom plan view of the plug.

In carrying my invention into practice, I provide a washout plug comprising a metal body 1 having an externally threaded and tapered inner end portion 2 to fit within a threaded opening in a boiler. The opposite or outer end portion 3 of this body is swelled or made of somewhat larger diameter than said inner end portion 2, and said body is provided with a bore 4 extending therethrough from end to end thereof. The outer end of this bore, or that portion normally bounded by the part 3 of the plug, is widened or of increased diameter with respect to its portion enclosed by the end 2. At the point of junction of said portions of the bore the plug is provided with an annular horizontal shoulder 5, which lies at the inner side of the base of the portion 3 and between the same and the bore 4, said shoulder 5 forming a seat for an annular gasket 6. The portion 3 is provided with internal screw threads 7 extending from its upper edge downwardly to a point above the seat shoulder 5, an unthreaded or relief surface 8 being left between the lower end of the screw threads 7 and the shoulder 5, as shown.

Arranged within the bore 4 is a tube 9 which is coextensive in length with the bore and of like diameter throughout. The inner end of this tube 9 is tightly fitted, i. e., with a press-fit, within the inner end of the bore, and the outer end 10 of such tube extends into the outer end of the bore and is disposed in spaced relation to and concentric with the part 3 of the plug. By this construction an annular channel or well 11 is formed between the part 3 of the plug and the part 10 of the tube, said parts 3 and 11 forming the outer and inner walls of said channel, at the base of which is arranged the gasket seat shoulder 5. The tube 9 may be secured by such a press-tight fit within the bore 4 that it will be held from displacement by frictional contact, but, if desired, additional means may be provided for securing it in place against any possibility of endwise motion or casual displacement. To this end, the tube 9 may be welded or otherwise fastened in position. As shown in the present instance, the inner end edge of the end 2 of the plug is cut away to provide receiving notches 12 at intervals, at which points portions of the tube are secured to the plug by spot-welding, as shown at 13.

The cap 14 is provided for sealing the plug. This cap is formed with a flange 15 adapted to be received within the channel 11, said flange having external screw threads 16 to engage the screw threads 7 of the wall 3. The cap may be of any suitable construction to adapt it to be engaged by a wrench or like tool, in order to facilitate its application and removal. In the present instance its crown is shown as provided with a depressed portion providing an internal wrench socket 17 of suitable angular form, but any other type of wrench receiving means may be employed.

The cap 14 is adapted to be applied and removed in an obvious manner. When applied the screw threads 16 of the flange 15 of the cap engage the screw threads 7 of the wall 3, thus locking the cap in position against the internal pressure. When the cap is applied the inner edge of the flange 15 rests upon the gasket 6 and presses this gasket firmly against its seat 5, thus making a fluid-tight connection which will prevent leakage through the joint. In practice the upstanding wall portion 10 of the tube 9 serves as a guard or fender to prevent the internal threads 7 of the wall 3 from being damaged by the inserted washout tool. For the purpose of facilitating the centering of the cap flange 15 within the channel 11 and the engagement of its threads 16 with the threads 7, the outer face of the flange of the cap is left free from threads or smooth-surfaced to provide a preliminary guide or contact surface 18 adapting the flange to be entered to a certain degree within the channel 11, so as to bring the cap and plug in axial alinement and to insure accurate engagement of the threads 16 with the threads 7. When the cap is fully applied this surface 18 lies opposite the unthreaded or relief surface 8 at the base of the wall 3.

In the manufacture of the plug, the wall of the bore 4 and the inner face of the wall 3 and seat surface 5 are machined to proper dimensions and a desired finish, after which the inner surface of the wall 3 is tapped to form the threads 7, which operations may be readily, conveniently and ecconomically performed prior to the introduction of the tube 9. The tube 9 is then inserted and expanded or otherwise pressed tightly in position, after which the operation of spot welding or otherwise permanently fastening the tube in position may be performed. The length of the tube, as stated, is preferably coextensive with that of the bore 4, so that the outer end edge of the tube will lie flush with the outer end edge of the wall 3 and the inner end edge of the tube will lie flush with the inner end edge of the plug body, as set forth, but these relative dimensions are not essential, in so far as the mode of securing the tube within the plug is concerned as the tube may terminate and be fastened to the interior of the plug at any point below the seat shoulder 5 or between the same and the inner end edge of the plug. It is preferred, however, to have the outer end edge of the wall portion 10 of the tube terminate in horizontal alinement or flush with the outer edge of the wall 3, since by this arrangement the end edge of the wall 10 will lie within and not beyond the plane of the outer end of the plug, and will thereby be better protected against injury by the washout tool, while said wall in turn will protect the threads 7 from injury by the washout tool. As shown, the plug 1 is preferably provided with a beveled relief surface 19 at the point of intersection of the inner end of the bore with the seat shoulder 5, in order to avoid any possibility of distortion of the seat shoulder when the tube 9 is applied.

By the construction of a washout plug of the character described, wherein a tube 9 with its guard wall 10 is fitted in position after the finishing operations on the plug are performed, it will be obvious that machining of the wall of the bore, seat shoulder 5 and the inner surface of the wall 3 and the tapping of the second-named to produce the threads 7 may be carried out in a ready, convenient and time-saving manner over any construction in which a wall portion, such as 10, is present to constrict the bore and hinder these operations. In practice, the tube 9 may be made of sheet metal of a suitable thickness for the purpose, but which may be materially thinner for the production of a wall portion 10 than if such a wall portion integral with the plug body were employed, enabling the plug to be made of comparatively small diameter at its outer end so that a saving of material may be effected. The provision being such that the surfaces may be machined and the threads 7 tapped before the tube 9 is applied, there is less liability of cracking or otherwise damaging the plug, even when made of comparatively frail construction. It will be evident, also, that in the event of possible damage to the shell 9 to such an extent as to render the wall 10 unserviceable, the plug may be removed from the boiler, the old shell removed and a new shell substituted, allowing old plugs to be salvaged and maintained in continuous use and with resultant economy.

Having thus fully described my invention, I claim:—

1. A washout plug comprising a plug body having an outer end portion and an inner end portion, the latter being externally threaded, and a bore extending through the plug and widened at said outer end portion, said widened outer end portion presenting an outer wall having internal threads, a tube formed separate from the plug body and fitted in the bore thereof so as to form with said outer wall an intervening channel, and a cap having a flange adapted to enter said channel and provided with external threads to engage the threads of said outer wall.

2. A washout plug comprising a plug having an outer end portion and an inner end portion, the latter being externally threaded, and a bore extending through the plug and widened at said outer end portion, said widened outer end portion presenting an outer wall having internal threads, a tube formed separate from the plug body and fitted in the bore thereof so as to form with said outer wall an intervening channel, said tube having its outer end terminating flush with the outer end of the outer wall, and a cap having a flange adapted to enter said channel and provided with external threads to engage the threads of said outer wall.

3. A washout plug comprising a plug body having an outer end portion and an inner end portion, the latter being externally threaded, and a bore extending through the plug and widened at said outer end portion, said widened outer end portion presenting an outer wall having internal threads, and an annular shoulder lying at the base of said wall at the inner side thereof and between the same and the bore, a tube formed separate from the plug body and fitted in the bore thereof and coacting with said outer wall and shoulder to form an annular channel, a gasket seated on said shoulder, and a cap having a flange adapted to enter said channel and press the gasket against the shoulder, said flange having external threads to engage the internal threads of the outer wall.

4. A washout plug having an end portion provided with an internally threaded outer channel forming wall, a tube fitted and secured in the plug and having a portion disposed opposite said outer wall and forming an inner channel wall, and a cap having a flange to enter the channel formed between said walls and provided with threads to engage the threads of the outer wall.

5. A washout plug comprising a metal plug body having an internally threaded outer channel forming wall, a separate metal tube secured to said body and having a portion disposed opposite said outer wall and forming an inner channel forming wall, and a cap having a flange to enter the channel formed between said walls and provided with threads to engage the threads of the outer wall.

6. A washout plug comprising a tubular plug body, a tube formed separately thereof and fitted therein, portions of the plug and tube forming the outer and inner walls of a channel, said outer wall being internally threaded, and a cap having a flange to enter said channel and externally threaded to engage the threads of the outer wall.

7. A washout plug comprising a tubular plug body, a separate tube press fitted in the bore of said body and mechanically fastened thereto, portions of the plug and tube forming the outer and inner walls of a channel, said outer wall being internally threaded, and a cap having a flange to enter said channel and externally threaded to engage the threads of the outer wall.

8. A washout plug comprising a tubular plug body, a separate tube press fitted in the bore of said body and welded thereto, portions of the plug and the tube forming the outer and inner walls of a channel, said outer wall being internally threaded, and a cap having a flange to enter said channel and externally threaded to engage the threads of the outer wall.

9. A washout plug comprising a metal tubular plug body, a metal tube press fitted within the bore thereof and welded thereto, portions of the plug and tube forming the outer and inner walls of a channel, said outer wall being internally threaded, and a cap having a flange to enter said channel and externally threaded to engage the threads of the outer wall.

10. A washout plug comprising a plug body having an outer internally threaded channel forming wall and a gasket seat disposed on the inner side of said wall and at the base thereof, a tube fitted and secured in the bore of said body and forming an inner channel forming wall, a gasket engaging said seat, and a cap provided with a flange adapted to enter the channel formed by said walls and having screw threads to engage the threads of the outer wall, the basal edge of said flange being adapted to engage and clamp the gasket against its seat.

11. The method of making a washout plug of the character described, which consists in forming a plug body having a bore enlarged in diameter at one end, the enlarged portion of the bore having a surrounding wall and an annular shoulder at the base of said wall and juncture of the bore portions, said plug at said bore portion of enlarged diameter being devoid of surfaces radially inward of the wall, machining said shoulder and cutting threads upon the inner surface of the wall, and then fitting in the plug a tube with one of its ends secured in the bore portion of smaller diameter and its other end extending beyond the shoulder and into the bore portion of larger diameter and spaced from the threaded surface of said wall to form therewith an annular channel.

In testimony whereof I affix my signature.

JULIUS KINDERVATER.